Dec. 10, 1968 F. C. BOLICK, JR 3,415,434

TAPE CONTROL DEVICE

Filed May 27, 1966 2 Sheets-Sheet 1

INVENTOR.
FRED C. BOLICK, JR.
BY Newton, Hopkins, Jones & Ormsby
ATTORNEYS

Dec. 10, 1968 F. C. BOLICK, JR 3,415,434

TAPE CONTROL DEVICE

Filed May 27, 1966

2 Sheets-Sheet 2

INVENTOR.
FRED C. BOLICK, JR.
BY Newton, Hopkins, Jones & Ormsby
ATTORNEYS

United States Patent Office 3,415,434

Patented Dec. 10, 1968

3,415,434
TAPE CONTROL DEVICE

Fred C. Bolick, Jr., Atlanta, Ga., assignor to Lanier Electronics Laboratory, Inc., Atlanta, Ga., a corporation of Georgia Filed May 27, 1966, Ser. No. 553,506
10 Claims. (Cl. 226—25)

ABSTRACT OF THE DISCLOSURE

What is disclosed is a tape control device for a recording-reproducing system in which a tape is pulled from a tape magazine by a tape driving device. The tape control device includes a pin member positioned in the tape magazine for substantially horizontal slidable movement in response to the tape being placed in a particular position by the tape driving device and a switch means responsive to the slidable movement of the pin member for rendering the tape driving device inoperative.

This invention relates to the control of the linear movement of a tape and, more particularly to a tape control device for discontinuing motion between two points of a tape in order to prevent tape breakage.

Recording-reproducing systems using an endless tape for recording information frequently provide for the motion of the tape to be independently controlled by each of a plurality of tape driving devices. Moreover, each tape driving device generally has the capability of imparting motion to the tape in any one of a plurality of directions. In recording-reproducing systems of this type, there is an inherent danger of tape breakage because of the probability that the plurality of tape driving devices will attempt to impart motion to the tape with the tape taut between them.

Accordingly, recording-reproducing systems of this type have generally provided a tape control device operative to render one or more tape driving devices in whole or in part inoperative when the endless tape is in a taut position between tape driving devices which would result in tape breakage with continued operation of the tape driving devices. A difficulty with these prior art tape control devices is that they frequently fail to operate and prevent tape breakage. Another difficulty is that having become operative, these prior art tape control devices frequently fail to return to inoperative position so that continued use may be made of the recording-reproducing system.

These and other difficulties are encountered with prior art tape control devices because most prior art tape control devices are biased into inoperative position only by gravity. Thus, they are responsive to changes in orientation and to vibration and jarring, and are easily jammed by the entanglement with the tape.

The invention disclosed herein avoids these difficulties with prior art tape control devices in that it provides a tape control device operatively responsive to a taut position of the tape but which is nevertheless positively biased into its inoperative position. Thus, the operation of the invention is independent of gravity and it is not responsive to orientation, vibration or jarring, or easily jammed by entanglement with the tape.

These and other features and advantages of the invention will be more clearly understood from the following detailed description and the accompanying drawings in which like characters of reference designate corresponding parts throughout and in which.

These figures and the following detailed description disclose a specific embodiment of the invention, but the invention is not limited to the details disclosed since it may be embodied in other equivalent forms.

The invention disclosed herein may be best understood as a tape control device T for controlling the motion of an endless tape 10 in a recording-reproducing system S having a plurality of independently operable tape driving devices 11 and 12 each of which is operative to impart motion to the tape 10. Recording-reproducing systems such as the recording-reproducing system S are well known to those skilled in the art and it is for this reason that the recording-reproducing system S is shown in FIG. 1 with only enough detail for an understanding of the invention disclosed herein.

Figure 1:
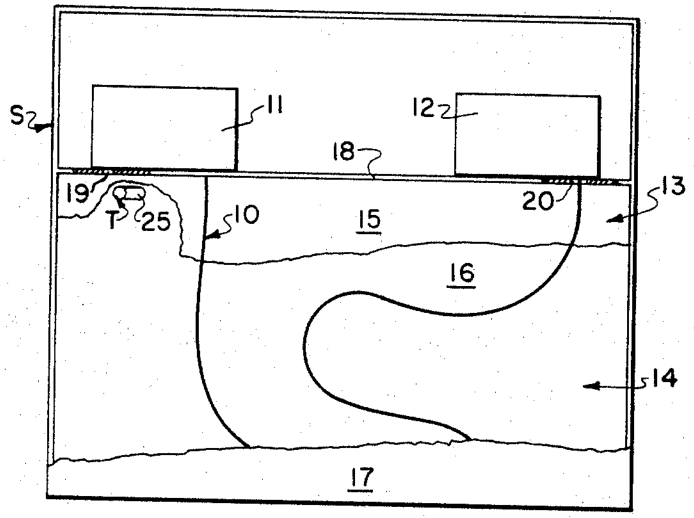
FIG. 1 is a schematic presentation of a recording-reproducing system in which an embodiment of the tape control device disclosed herein is used.

From FIG. 1, it will be seen that the recording-reproducing system S includes a first tape magazine 13 and a second tape magazine 14 positioned to receive the tape 10 as it passes between the tape driving devices 11 and 12. The tape magazines 13 and 14 are formed in part by parallel walls 15, 16, and 17 with the wall 16 serving as a common wall for the tape magazines 13 and 14.

The tape magazines 13 and 14 have a common cover plate 18 on which the tape driving devices 11 and 12 are mounted and it will be understood by those skilled in the art that through an aperture 19 in the cover plate 18 adjacent the tape driving device 11, the tape driving device 11 is operative to remove the tape 10 from the tape magazine 13 and deposit the tape 10 in the tape magazine 14 or to remove the tape 10 from the tape magazine 14 and deposit the tape 10 in the tape magazine 13. Similarly, through an aperture 20 in the cover plate 18 adjacent the tape driving device 12, the tape driving device 12 is operative to remove the tape 10 from the tape magazine 13 and deposit the tape 10 in the tape magazine 14 or to remove the tape 10 from the tape magazine 14 and deposit the tape 10 in the tape magazine 13.

Figure 2:
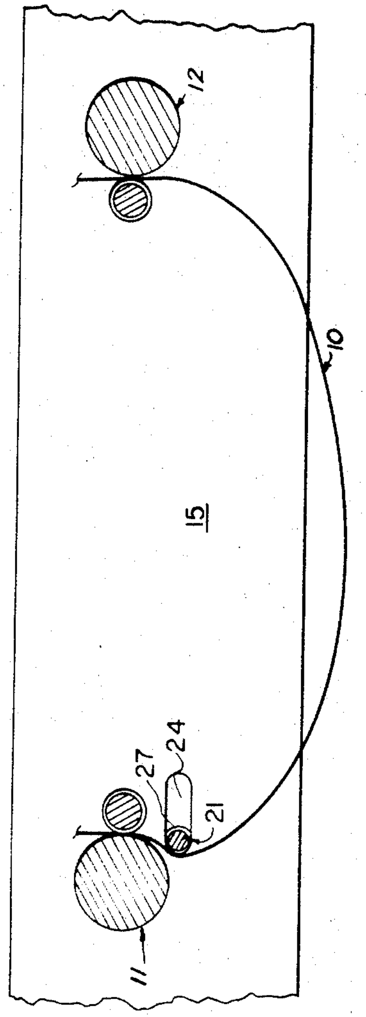
FIG. 2 is a fragmentary view of the recording-reproducing system shown in FIG. 1 showing the position of the pin member of the tape control device when the tape control device is inoperative.

It will also be understood by those skilled in the art that the tape driving devices 11 and 12 are independently operative to provide any of these motions of the tape 10 when the tape 10 in the tape magazines 13 and 14 is in a plurality of layers as shown in FIGS. 1 and 2. This is because the length of the tape 10 stored in each magazine 13 or 14 permits motion of the tape 10 out of the tape magazine 13 or 14 through the apertures 19 and 20.

Figures 3, 4:
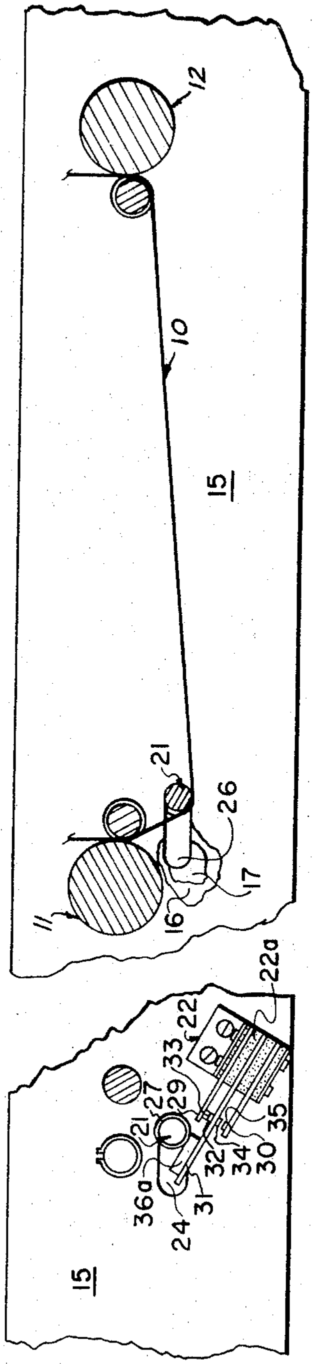
FIG. 3 is a fragmentary side elevational view of the recording-reproducing system of FIG. 1 showing the position of the pin member of the tape control device when the tape control device is operative.
FIG. 4 is a fragmentary side elevational view of the recording-reproducing system shown in FIG. 1 showing a switch member of the tape control device.

However, it will be understood that when the tape 10 in a tape magazine 13 or 14 is in that taut position shown in FIG. 3, tape breakage will frequently occur when a tape driving device 11 or 12 is operated to pull the tape 10 from the tape magazine 13 or 14 while the other tape driving device 11 or 12 is holding the tape 10 stationary or is also being operated to pull the tape 10 from a tape magazine 13 or 14. It is to the prevention of tape breakage by operation of the tape driving devices 11 and 12 when the tape 10 is in a taut position that the invention disclosed herein is directed. It is for this reason that the tape control device T is itself disclosed in detail.

That embodiment of the tape control device T disclosed herein comprises a pin member 21 slidably movable in response to the position of the tape 10 and a switch means such as a switch member 22 responsive to the motion of the pin member 21 for rendering the tape driving devices 11 and 12 in whole or in part inoperative. The pin member 21 comprises a pin 23 extending through a slot 24 in the wall 15, a slot 25 in the wall 16, and a slot 26 in the wall 17. That end of the pin 23 extending outwardly from the wall 15 carries a sleeve 27 and that end of the pin 23 extending outwardly from the wall 17 carries a sleeve 28. The sleeves 27 and 28 serve to maintain the pin 23 in the slots 24, 25, and 26 while permitting the pin 23 to be slidably movable within the slots 24, 25 and 26.

The slots 24, 25, and 26 are positioned in the walls 15, 16, and 17 respectively so as to place the pin 23 across the tape magazines 13 and 14 in a position which is beneath the cover plate 18 and adjacent the aperture 19 and so as to provide for horizontal motion of the pin 23 to and from this position in the direction of the aperture 20. Thus, in both the tape magazine 13 and the tape magazine 14, the pin 23 is adjacent the tape 10 as the tape 10 passes to or from the tape driving device 11, and in both the tape magazine 13 and the tape magazine 14, the tape 10 must pass around the pin 23 in moving between the aperture 19 and the aperture 20.

It will now be understood that when the tape 10 is flowing freely into and out of the tape magazines 12 and 14 as shown in FIGS. 1 and 2, the pin 23 is freely positionable in any of a plurality of positions in the slots 24, 25, and 26. However, when the tape 10 is in that taut position shown in FIG. 3, in either the tape magazine 13 or the tape magazine 14, the pin 23 is urged to the right as viewed in FIG. 2 toward the aperture 20. It is to this motion of the pin 23 that the switch member 22 is operatively responsive.

Figure 5:
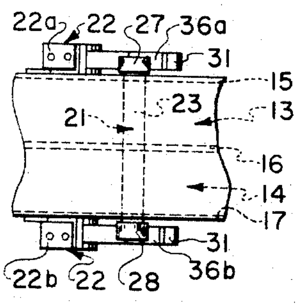
FIG. 5 is a fragmentary top plan view of the recording-reproducing system shown in FIG. 1 showing the tape control device.
Figure 6:
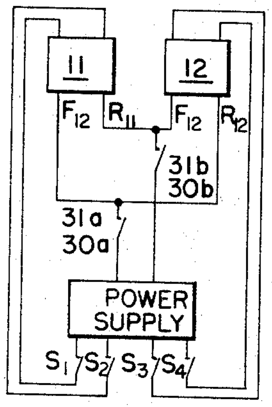
FIG. 6 is a schematic diagram showing a circuit arrangement for a recording-reproducing system which includes the tape control device.

From FIGS. 5 and 6, it will be seen that there are two switch members 22 in the embodiment of the invention disclosed herein. The switch member **22*a* is mounted on the wall 15 adjacent the sleeve 27 and the switch member 22*b* is mounted on the wall 17 adjacent the sleeve 28. Each switch member 22 is a leaf switch having two stationary outer leaves 29 and 30 and an inner leaf 31. The inner leaf 31 is resiliently movable from a normal position parallel to the outer leaf 29 into an operative position in which it is bent toward the outer leaf 30. In the normal position of the inner leaf 31, a contact point 32 on the inner leaf 31 engages a contact point 33 on the outer leaf 29 and in the operative position of the inner leaf 31, the contact point 32 on inner leaf 31 disengages the contact point 33 on the outer leaf 29 and a contact point 34 on the inner leaf 31 engages contact point 35 on the outer leaf 30**.

The inner leaf 31 of a switch member 22 carries an actuator pad 36 positioned outwardly of the outer leaves 29 and 30 and the switch member **22*a* is positioned on the wall 15 so that the actuator pad 36*a* engages the sleeves 27 and so that the inner leaf 31*a* is moved from its normal position to its operative position with motion of the pin 23 to the right in the slot 24 as viewed in FIGS. 2 and 3. Similarly, the switch member 22*b* is positioned on the wall 17 so that the actuator pad 36*b* engages the sleeve 28 and so that the inner leaf 31*b* is moved from its normal position to its operative position with motion of the pin 23 to the right in the slot 26** as viewed in FIGS. 2 and 3.

*Operation*

It will now be understood that the sleeve 27 and the switch member **22*a* together serve to hold that end of the pin 23 on which the sleeve 27 is mounted at the left end of the slot 24 while at the same time providing for resilient and substantially horizontal slidable motion of the pin 23 toward the right as viewed in FIGS. 2 and 3 and that such slidable motion opens the contact points 32*a* and 33*a* and closes the contact points 34*a* and 35*a*. Similarly, it will be understood that the sleeve 28 and the switch member 22*b* together serve to hold that end of the pin 23 on which the sleeve 28 is mounted at the left end of the slot 26 while at the same time providing for resilient and substantially horizontal slidable motion of the pin 23 toward the right as viewed in FIGS. 2 and 3 and that such slidable motion opens the contact points 32*b* and 33*b* and closes the contact points 34*b* and 35*b***.

It will also be understood that with the tape 10 in the tape magazine 13 in that taut position shown in FIG. 3, the operation of a tape driving device 11 or 12 in a manner which tends to pull the tape 10 from the tape magazine 13 will move that end of the pin 23 extending through the slot 24 to the right in the slot 24 as shown in FIG. 3 to open the contact points **32*a* and 31*a* and close the contact points 34*a* and 35*a*. When the tape 10 is not in that taut position shown in FIG. 3 or is released from this taut position by the operation of the tape driving devices 11 and 12, the resiliency of the inner leaf 31*a* maintains or moves the pin 23 to the left in the slot 24 so as to close the contact points 32*a* and 33*a* and open the contact points 34*a* and 34*b***.

The position of the tape 10 in the tape magazine 14 controls the contact points of the switch member **22*b* in a similar fashion independently of the portion of the tape 10 in the tape magazine 13. Thus, the pin 23 is at the left end of all the slots 24, 25 and 26 when the tape 10 is not in a taut position in either the tape magazine 13 or the tape magazine 14, and is pivoted across the tape magazines 13 and 14 when the tape 10 is in a taut position in a tape magazine 13 or 14**.

It is by the selective opening and closing of the contact points 32, 33, 34 and 35, that the tape control device T disclosed herein prevents breakage of the tape 10. This can best be shown by placing the contact points 32, 33, 34 and 35 in a circuit arrangement for a recording-reproducing system such as that shown in FIG. 6.

From FIG. 6, it will be seen that the tape driving device 11 is controlled by a forward motion switch S1 and a backward motion switch S2. The forward motion switch S1 serves to energize the tape driving device 11 in a manner which results in the tape 10 passing from the tape magazine 13 to the tape magazine 14 through the aperture 19 in the cover plate 18 and the backward motion switch S2 serves to energize the tape driving device 11 in a manner which results in the tape 10 passing from the tape magazine 14 to the tape magazine 13 through the aperture 19 in the cover plate 18.

The tape driving device 12 is controlled by a forward motion switch S3 and a backward motion switch S4. The forward motion switch S3 serves to energize the tape driving device 12 in a manner which results in the tape 10 passing from the tape magazine 14 to the tape magazine 13 through the aperture 20 in the cover plate 18 and the backward motion switch S4 serves to energize the tape driving device 12 in a manner which results in the tape 10 passing from the tape magazine 13 to the tape magazine 14.

The switches S1, S2, S3, and S4 selectively energize the tape driving devices 11 and 12 from a common power source 40 and from FIG. 6, it will be seen that the contact points **32*a* and 33*a* of the switch member 22*a* are in series with both the switch S1 and the switch S3. Similarly, it will be seen that the contact points 32*b* and 33*b* of the switch member 22*b* are in series with both the switch S2 and the switch S4**.

Thus, when the tape 10 in the tape magazine 13 is in the taut position shown in FIG. 3, the switches S1 and S3 are rendered inoperative. As a result, the closing of the switch S1 will not energize the tape driving device 11 in the manner which results in the tape 10 passing from the tape magazine 13 to the tape magazine 14 and the closing of the switch S3 will not energize the tape driving device 12 in the manner which results in the tape 10 passing from the tape magazine 13 to the tape magazine 14. It will be understood that this prevents tape breakage while still providing for that motion of the tape 10 in response to the switches S2 and S4 required to release the tape 10 from its taut position.

When the tape 10 is in a taut position in the tape magazine 14, the rendering of the switches S2 and S4 inoperative while the switches S1 and S3 remain operative serves in similar manner to prevent tape breakage while still providing for that motion of the tape 10 required to release the tape 10 from its taut position. It will now be understood that the circuit arrangement shown in FIG. 6 is only generally representative of possible circuit arrangements in which the tape control device T may be used. Moreover, it will also be understood that the contacts 34 and 35 of the switch members 22 are not used in this circuit arrangement other than to provide each switch member 22 with a position in which it is operative to render a switch S1, S2, S3 or S4 inoperative, but in other circuit arrangements these contact points 34 and 35 may be used to energize other circuits such as a warning circuit.

Moreover, it will be understood that regardless of the particular circuit arrangement in which the invention is used, the invention provides a tape control device T which is positively biased into an inoperative position at which the switches S1, S2, S3 and S4 are all operative and which is independent of gravity and not responsive to orientation, vibration, or jarring or easily jammed by entanglement with the tape 10.

It will be obvious to those skilled in the art that many variations may be made in the embodiments chosen for the purpose of illustrating the present invention without departing from the scope thereof as defined by the appended claims.

What is claimed as invention is:

1. In a tape control device for a recording-reproducing system having a tape which is selectively moved along a plurality of paths through a tape magazine by the operation of a tape driving device, a pin member positioned within said tape magazine for substantially horizontal slidable movement in response to movement of said tape in a predetermined path, and a switch means responsive to said slidable movement of said pin member for rendering said tape driving device inoperative to move said tape in said predetermined path.

2. The tape control device of claim 1 in which said slidable movement of said pin member is in a predetermined direction and said switch means resiliently urges said pin member in a direction opposite to said predetermined direction.

3. The tape control device of claim 2 in which said pin member is positioned below the ends of said predetermined path within said tape magazine and above said predetermined path as it extends between said ends.

4. The tape control device of claim 3 in which said pin member extends across said tape magazine and across a second tape magazine and in which said pin member is positioned within said second tape magazine for substantially horizontal slidable movement in response to motion of said tape in a predetermined path through said second tape magazine.

5. The tape control device of claim 4 including a second switch means for rendering said tape driving device inoperative to move said tape in said predetermined path through said second tape magazine.

6. The tape control device of claim 1 in which said tape driving device is rendered operative to increase the length of said tape in said tape magazine simultaneously with being rendered inoperative to move said tape in said predetermined path.

7. The tape control device of claim 1 in which said pin member extends through an elongate slot in a wall defining a side of said tape magazine and in which said switch means is a switch member positioned on said wall adjacent an extending end of said pin member and operatively connected to said tape driving device.

8. The tape control device of claim 7 in which said switch member includes a resilient leaf positioned to engage said extending end of said pin and urge said pin toward an end of said slot.

9. The tape control device of claim 8 in which a contact point is positioned on said resilient leaf to engage a second contact point when said pin is at said end of said slot and in which said contact points are in series with a means for controlling the operation of said tape driving device.

10. The tape control device of claim 9 in which said pin moves from said end of said slot in response to said movement of said tape.

References Cited

UNITED STATES PATENTS

| | | | |
|---|---|---|---|
| 2,208,946 | 7/1940 | Newman | 226—43 |
| 3,092,346 | 6/1963 | Goodell et al. | 242—55.13 |
| 3,094,293 | 6/1963 | Schultz | 226—44 X |
| 3,112,052 | 11/1963 | Johnson. | |

ALLEN N. KNOWLES, *Primary Examiner.*

U.S. Cl. X.R.

226—43, 44, 109